United States Patent [19]

Sinclair

[11] 4,416,512
[45] Nov. 22, 1983

[54] NON-MECHANICAL ELECTROMAGNETIC SCANNING DEVICE

[76] Inventor: Brett J. Sinclair, P.O. Box 11415, Denver, Colo. 80211

[21] Appl. No.: 385,750

[22] Filed: Jun. 7, 1982

Related U.S. Application Data

[63] Continuation of Ser. No. 159,898, Jun. 16, 1980.

[51] Int. Cl.³ .................. G02B 27/10; G02B 27/17
[52] U.S. Cl. .................................. 350/171; 350/321
[58] Field of Search ............... 350/171, 172, 173, 169, 350/294, 6.6, 6.5, 6.1, 321

[56] References Cited

U.S. PATENT DOCUMENTS

| | | | |
|---|---|---|---|
| 3,437,954 | 4/1969 | Herriott et al. | 350/294 |
| 3,485,552 | 12/1969 | Adler | 350/169 |
| 3,501,222 | 3/1970 | Herriott et al. | 350/171 |
| 3,501,223 | 3/1970 | Rack | 350/171 |
| 3,748,014 | 7/1973 | Beiser | 350/6.6 |

FOREIGN PATENT DOCUMENTS

| | | | |
|---|---|---|---|
| 1937696 | 2/1971 | Fed. Rep. of Germany | 350/294 |
| 2429551 | 1/1975 | Fed. Rep. of Germany | 350/171 |
| 2709352 | 9/1977 | Fed. Rep. of Germany | 350/171 |
| 52-5540 | 1/1977 | Japan | 350/171 |
| 650088 | 2/1979 | U.S.S.R. | 350/169 |

Primary Examiner—Jon W. Henry
Attorney, Agent, or Firm—William A. Drucker

[57] ABSTRACT

A system is for use in a non-mechanical electromagnetic scanning device having a source of pulsed beams of electromagnetic energy including laser beams or the like, and a modulator for an array of pulsed beams produced by the system. The system is comprised of first and second opposed mirrors and/or lenses disposed in spaced relationship with one of the mirrors and/or lenses being less than wholly reflective, the arrangement being such as; at each pass between the mirrors and/or lenses; to offset a pulsed beam directed onto one of the mirrors and/or lenses and reflected towards the other mirror and/or lens so as to result in a plurality of successive passes of pulsed beam, a portion of the beam emerging at each pass through the second mirror or lens to form an array of pulsed beams, the beam being refocused at each pass in each direction between the mirrors and/or lenses.

3 Claims, 13 Drawing Figures

NON-MECHANICAL ELECTROMAGNETIC SCANNING DEVICE

This is a continuation of Ser. No. 159,898, filed June 16, 1980.

BACKGROUND OF THE INVENTION

The use of laser devices in information-processing, display, or optical radar applications, requires the development of economical means for rapidly scanning and/or deflecting a high-resolution spot of coherent light.

A number of means of deflection have been suggested and reduced to practice. These have ranged from rotating mirrors to electro-optical systems. All of these systems require at least one "moving" element, e.g. a piezoelectric element caused to vibrate, a magnetorestrictive device controlled electrically, or mirrors revolving on a drum or oscillated by a galvanometer.

In order to obtain highly accurate movements, the known devices must resort to sophisticated electrical and/or mechanical means which increases the cost of these systems, thus making them unsuitable for many commercial applications. Furthermore, even with these expensive and sophisticated means, errors inherent in any moving system make them impractical, in principle, for many applications.

All deflection/scanning devices must address themselves to the following points with respect to function and usefulness: (1) What are the losses in the system due to the diminishing of the light intensity, (2) What are the aperture limitations, or what is the largest number of high-resolution spots obtainable in a given system with a given aperture, (3) What are the limitations imposed by diffraction losses, or in practical terms, how does the device cope with the continuous spreading of the laser beam, (4) Will the deflection system result in a linear scan pattern, i.e. will the distances between each of the resolvable spots be uniform, and finally (5) What is the largest number of high-resolution spots obtainable with the system for practical applications Without a demonstrable solution to these questions, no scanning/deflection system can hope to be useful; it would remain merely an anomaly.

LOST LIMITATIONS

A laser is a light amplifier; optical "gain" is achieved by utilising a medium which has three or more energy levels. In the absence of "pumping", the population of the lower levels exceeds that of higher ones and all transitions from one level to another are absorptive. If pumping excitation (the pumping may be optical, electrical, or chemical, depending on the system) is applied selectively between the lowest level and the highest level, the level populations are modified.

A laser oscillator is constructed by utilising a laser gain medium inside an optical cavity. Optical regenerative gain occurs for light travelling along the cavity axis. The cavity length is typically $10^3$ to $10^6$ times larger than the laser wavelength, but typically more than one axial or longitudinal cavity resonance will fall within the laser gain profile.

Oscillation occurs at those cavity resonances lying within the inhomogeneous width of the laser transition for which the laser gain exceeds the cavity losses.

The energy density in the inverted material increases exponentially with respect to relative bandwidth.

The devices discussed below deal with pulsed electromagnetic beams, and must be assured of continuous uniform pulses. A possible explanation of why the pulse does not spread out is that the inversion changes as the pulse travels through the medium, and this reduces the slope of the pulse dispersion, so that the trailing edge tends to move slightly faster than the leading edge, thereby compressing the pulse and counteracting the effect of dispersion which would spread it out.

This information can be found in any advanced treatment of the subject and falls under state-of-the-art knowledge. These well-established facts will be used in all of the embodiments mentioned below. All of the embodiments mentioned, where distances are great enough to warrant either continuous or intermittent re-amplification, may take advantage of existing means for the necessary re-amplification.

APERTURE LIMITATIONS

In optics, the aperture refers to the size of the lens or mirror that admits or reflects light, respectively. This is the diameter $D_L$ of a lens or mirror. In scanning/deflection schemes, $D_L$ is equal to or greater than the product of the number of scans (number of high-resolution spots), N, and the size of the high-resolution spot, S; ($D_L = NS$).

Figure 1:
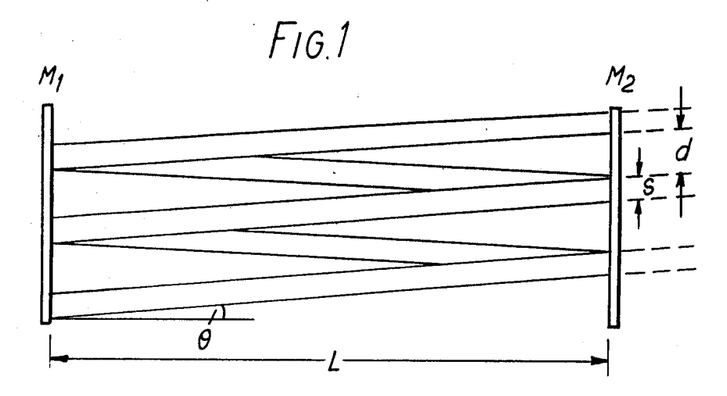
FIG. 1 is a schematic side elevation of a phased array scanner having two plane parallel mirrors.

Reference is now made to FIG. 1 of the drawings, which shows schematically a phased array scanner. The system has two plane, parallel mirrors, of separation L and aperture D.

A laser beam, either pulsed or continuous, of diameter S enters mirror $M_1$ at angle $\theta$. A system of parallel beams emerges at mirror $M_2$, each being of diameter S ignoring diffraction losses, and of separation $d = 2L \sin \theta$ where $d > S$. If the system is diffraction limited, meaning that D is finite, then the number of spots is:

$$N < [D^2/(2L\lambda)]^{\frac{1}{2}}$$

Assuming that $\lambda = \frac{1}{2} \times 10^{-6}$ and L = 15 cm, then for N = 1000, S = 1.7 meters, and for N = 100 S = 0.55 cm. This simple scheme is impractical for any reasonable number of high-resolution spots.

All of the embodiments described herein deal with this problem. It becomes obvious, upon analysis of the equation used, that N (the number of spots) is the basic difficulty. If it were possible to make this factor less important mathematically, or to eliminate it entirely from the equation, the problem would be solved.

DIFFRACTION LIMITATIONS

The number of different directions is limited by diffraction. The direction of two beams must differ at least by the diffracting opening o unit area, and the diffracting angle is of the order of $\theta = \lambda/d$.

Referring again to FIG. 1, and analyzing it for diffraction losses, one need only calculate two extremes: $D_1$, the diameter of the first spot; and $D_N$, the diameter of the last or Nth spot. Since each output spot must be separated, even if they are adjacent, the required separation and mirror angle is determined by the largest spot.

In this system, either the first or the Nth spot will be the largest, and the minimum value of ND is found where $D_1 = D_N$. If $D_1$ is made larger, the system utilises the near-field of the beam and $D_N$ can be made smaller; or if $D_N$ is made larger, the system then utilises the far-field of the beam, and $D_1$ can be made smaller. However, if $D_1$ or $D_N$ is larger, then ND will be larger.

If "best case" calculations are made, neglecting higher order modes or side lobes of the beam after propagation, and if it is assumed that $D_1$ is the diameter of a uniform entrance beam, the diameter to the first null of the exit beam is:

$$D_N = 2\lambda(0.3N)/D_1$$

where 0.3N is the total distance travelled in meters using the numbers of the above example.

LINEARITY

Linearity is obviously no problem with plane mirrors, but if use is made of curved mirrors and/or lenses, this changes. Curved mirrors and lenses can be regarded as equivalent mathematically. Two or more mirrors or lenses with different focal lengths will have a magnifying or demagnifying effect. This will cause non-linearity in any scanning/deflection system relying on curved lenses or mirrors of different focal lengths.

Figure 2:
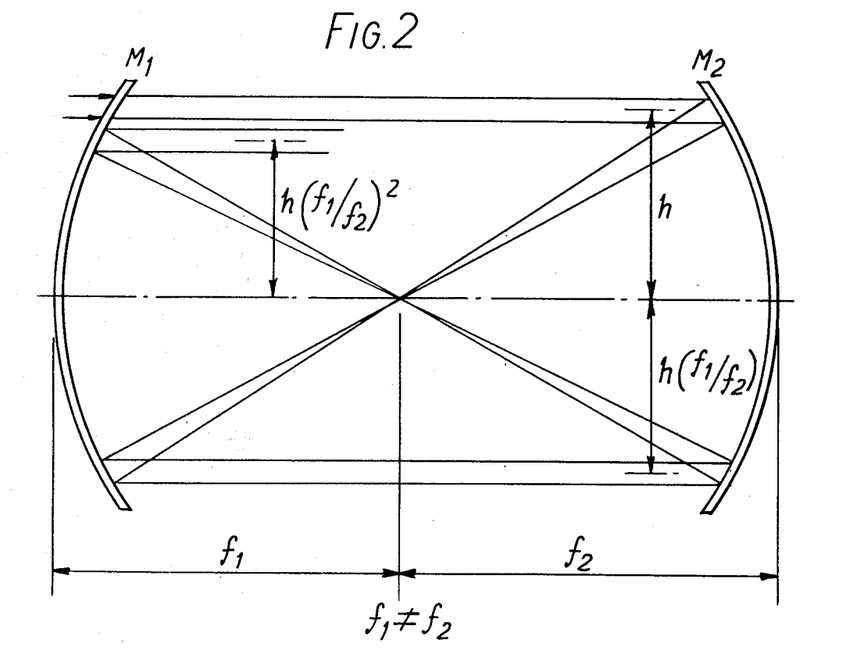
FIG. 2 is a schematic side elevation of a system having two curved mirrors of different focal lengths.

Reference is now made to FIG. 2 of the drawings, which shows two curved mirrors of different focal length, optically aligned and with their foci at the same point.

The beam first enters at a height h from the axis of the system. After one passage through the focal point, it appears at the other side of the axis at a distance $h(f_1/f_2)$ below it. The system then acts as an imaging system with demagnification $f_1/f_2$.

After a second pass through the focal point, the beam is at $h(f_1/f_2)^2$ above the axis. If this same distribution were repeatedly re-imaged, on the even numbered times, above the axis, the positions of the scans with respect to the axis would be as follows: h, $h(f_1/f_2)$, $h(f_1/f_2)^4$, ... $h(f_1/f_2)^{2N}$ where N is the number of scans. Hence, even though the system does scan, it does so in a highly non-linear fashion.

Even if the allowed deviation from linearity is very small, mathematical analysis shows that:

$$S = 16 F\# K_T \delta$$

where S is the beam diameter, $\lambda$ is the wavelength, $F\#$ is the focal length divided by the mirror diameter, $K_T$ is the number of scan positions, and $\delta$ is the deviation from a linear scan.

With $K_T = 100$ and $\delta = 0.1$, $\lambda = \frac{1}{2} \times 10^{-6}$ meters, we obtain:

$$S = 0.8 F\# \text{cm}.$$

Since the F# should be greater than 1, the spot diameter will be very large for practical purposes.

More complex arrangements, having a series of the same "magnification factors", will have the same problems which cannot be cancelled out.

HIGH-RESOLUTION SPOTS

High-resolution spots appear to be the solution to $$d_o \approx 2\lambda f/S$$

This aspect is dealt with in detail in the description (given later herein) of the preferred embodiments.

OBJECT OF THE INVENTION

It is the object of the invention to provide a category of pulsed electro-magnetic energy beam scanning systems which maintain a uniform pixel size for any number of scans, depending upon the size and configuration of the system, by refocusing of each scan to obtain a array of image points.

DESCRIPTION OF THE PREFERRED EMBODIMENTS

A first preferred embodiment, using two fresnel lenses, is described with reference to FIG. 3, and this system limits the influence of the number of high-resolution spots in the equations for the spot diameter.

Figure 3:
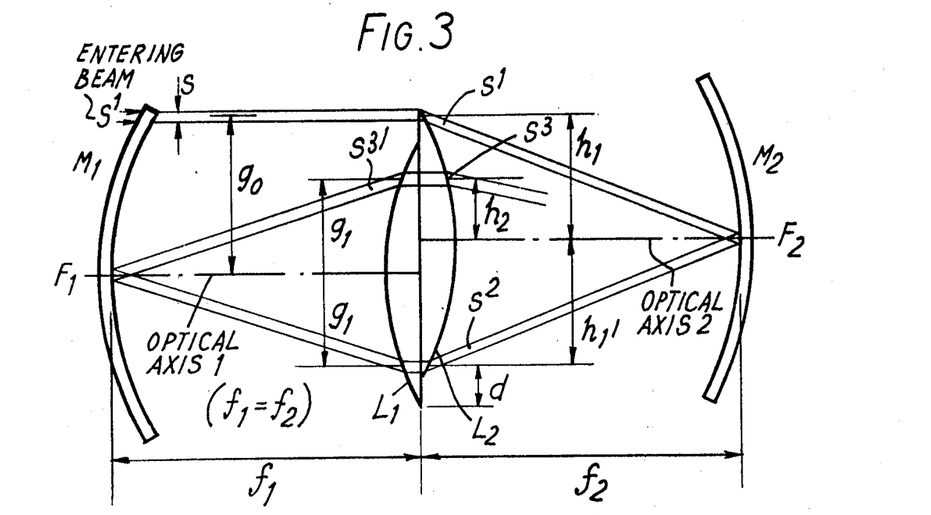
FIG. 3 is a schematic side elevation of a first preferred embodiment of system having two fresnel lenses.

Referring to FIG. 3, $L_1$ and $L_2$ are fresnel or hyperbaloid lenses with the same focal lengths ($f_1 = f_2$). $M_1$ and $M_2$ are spherical mirrors, but could in practice be flat mirrors, with the output taken at $F_1$ or $F_2$. The optical axes of $L_1$ and $L_2$ are displaced, but remain parallel to each other so that one lies above the other, in the figure. A pulsed beam, $s^1$, enters $L_2$ parallel to both optical axes. The beam will travel to $F_2$, the focal point of $L_2$, and reflect from $M_2$ back to $L_2$. Note that $h_1$, the distance of $s^1$ to optical axis 2, is the same as $h'_1$, the distance of $s^2$ to optical axis 2. The beam, when passing within the fresnel or hyperbaloid lenses $L_1$ and $L_2$, propagates parallel to both optical axes and remains at constant diameter. The beam, now at the surface of $L_1$, is deflected to $F_1$, the focal point of $L_1$, where it is reflected back to $L_1$. The beam, then going through $L_1$ and $L_2$, emerges at $s^3$ parallel to the optical axes but displaced "downward", i.e. closer to optical axis 2. This entire procedure is repeated many times for a large number of output beams.

The output is taken at one of the focal points $F_1$ or $F_2$. All of the output beams appear to start at a single point and fan out. These output beams could be made parallel and any distance apart by standard collimating techniques known in the art.

Figure 4:
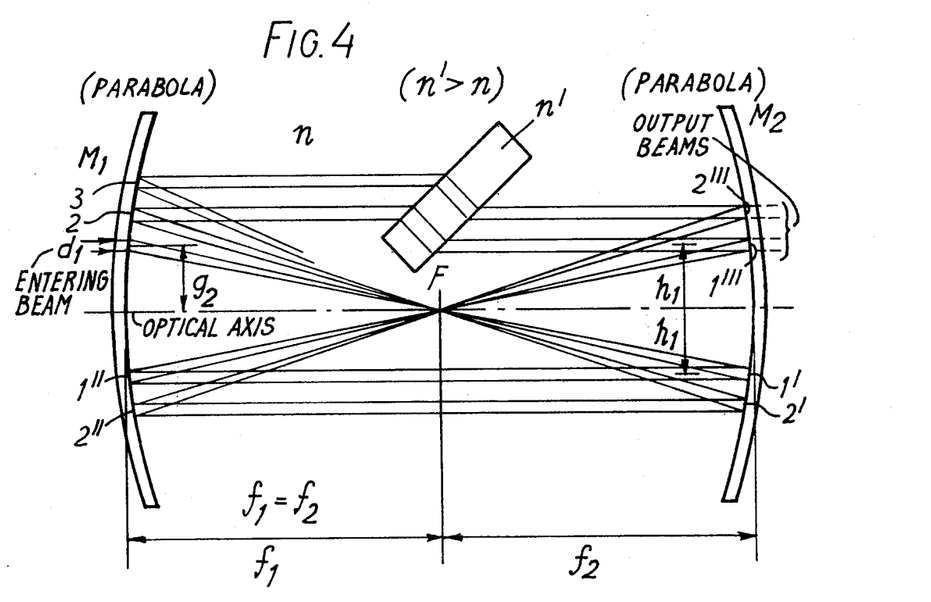
FIG. 4 is a schematic side elevation of a second preferred embodiment of system having two parabolic mirrors with equal and congruent focal lengths.

Reference is now made to FIG. 4, which shows a second preferred embodiment.

The system is similar in principle to that of the first preferred embodiment, but offers certain design advantages in some applications.

Referring to FIG. 4, $M_1$ and $M_2$ are parabolic mirrors with equal and congruent focal lengths, $f_1$ and $f_2$, and face each other with the same optical axis. A pulsed beam, d, entering at $M_1$ at 1 in the upper left of the figure at height $g_2$, goes through the focal point, F, to $M_2$ at $1^1$, and back to $M_1$ at $1^{11}$ parallel to the optical axis at height $h_1$. (Note: $g_2 = h_1$). It then returns (through the focal point, F, to $M_2$ at $1^{111}$) where part of it leaves as the output. The remaining portion of the pulsed beam goes toward $M_1$ parallel to the optical axis. However, before it reaches $M_1$, it passes through a plane parallel plate having a higher index of refraction than the surrounding medium. This being the case, the beam is refracted and emerges parallel to its initial path, but displaced away from the optical axis. This is repeated many times to obtain an array of high-resolution spots.

With respect to the linearity of both these systems and referring to FIG. 3:

$$d + h_2 = g_1.$$

In general:

$$h_i = g_{i-1} - d$$

for the i-th scan, where $i = 1, 2 \ldots$
In addition:

$$g_i = h_i - d$$

and from the above $$h_i = h_{i-1} - 2d$$

where $i = 1, 2, 3, \ldots$ and $h_o = g_o$.

Hence the scan is linear. Furthermore, it can now be seen that only with all focal lengths being the same is linearity possible; scanning must be achieved with all systems of this sort by displacing the optical elements along the axis perpendicular to the optical axis or by some other means that accomplishes the same task.

Figure 7:
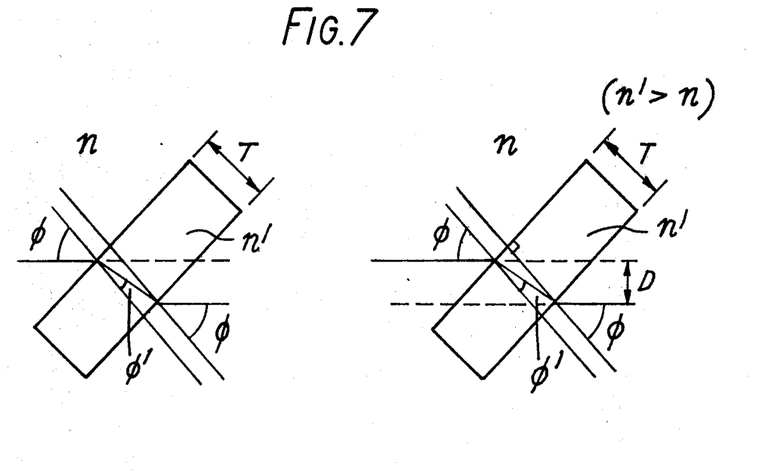
FIG. 7 is a mathematical diagram to explain the function of a plane parallel plate system.

Referring to FIG. 7, the mathematics of the plane parallel plate is evident:

$$D = T \sin \phi \left[ 1 - \frac{n}{n^1} \frac{\cos \phi}{\cos \phi'} \right]$$

To make the beams adjacent, one merely lets D equal the beam diameter.

For the rest of the mathematical analyses it will be assumed that the spot spacing equals the spot diameter equals S.

In FIG. 3 the output mirror is used to focus the pulsed beam and the path which is interesting is the focal length of the lens, f. Let it be assumed further that, for a minimum, the output spot size S must equal $S^1$ equals $S^2$ equals $S^3 \ldots$ equals $S^n$.

From diffraction theory:

$$S = 2\lambda f/S.$$

Hence:

$$S^2 = 2\lambda f$$

The F# of the lens (or mirror) is f/D, where D (the aperture diameter) equals SN, and N is the number of high-resolution spots.

$$S^2 = 2\lambda f = 2\lambda DF\#$$
$$= 2\lambda NSF\#$$

and:

$$S = 2\lambda NF\#$$

If the output mirror does not focus, as in FIG. 4, the path length of interest is 2f. And:

$$S = 4\lambda NF\#$$

Illustrating both of these equations for $N = 1000$; $F\# = 2\lambda = \frac{1}{2} \times 10^{-6}$ meters, $S = 0.1$ mm for the system in FIG. 3 and $S = 0.2$ mm for the system in FIG. 4.

Both of these systems as presented will give a one-dimensional line scan. In order to obtain a two-dimensional scan array, one must take the appropriate mirrors and lenses of FIGS. 3 and 4 of a hyperbaloid and parabaloid cross-section respectively. This will allow a focused pulsed output beam in a two-dimensional array.

Figure 8:
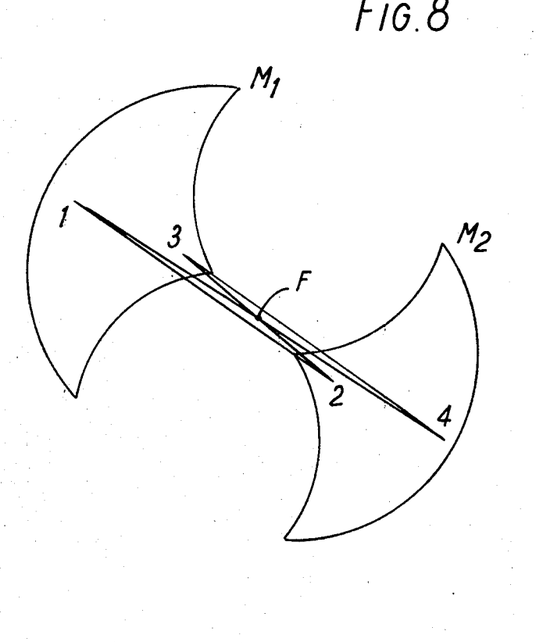
FIG. 8 is a schematic view to illustrate operation of a two-dimensional scanning system.

FIG. 8 is merely illustrative of the principle behind the system, but in and of itself it does not scan. An initial pulsed beam enters $M_1$ at (1) where it travels to $M_2$ parallel to the optical axis and strikes it at (2). The beam is then deflected to F (the focal point of both mirrors) and travels back to $M_1$, reflecting from it at (3). It then travels back to $M_2$ parallel to the optical axis, striking it at (4). The beam then goes through F and strikes $M_1$ at (1), the initial starting point of the path 1-2-3-4.

To have the system scan one-dimensionally, one need only place a plane parallel plate in a similar manner to that of the system in FIG. 4. This will cause a scan line pattern from $M_2$ starting at (2) and going "down" the mirror in parallel outputs parallel to a side view of the system.

Figure 10:
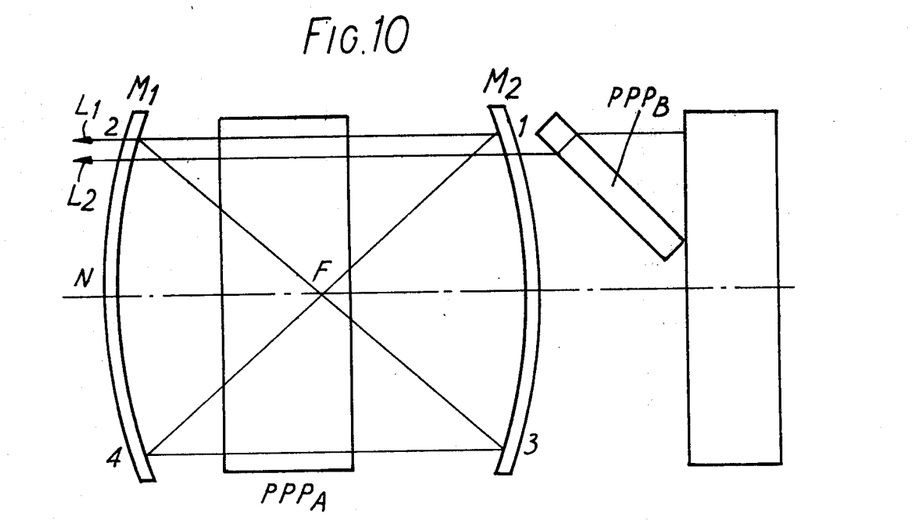
FIGS. 10, 11 and 12 are respectively a top view, a side view, and a dimetric projection of the system of FIG. 4, but with the added elements necessary for a two-dimensional scanning system.
Figure 11:
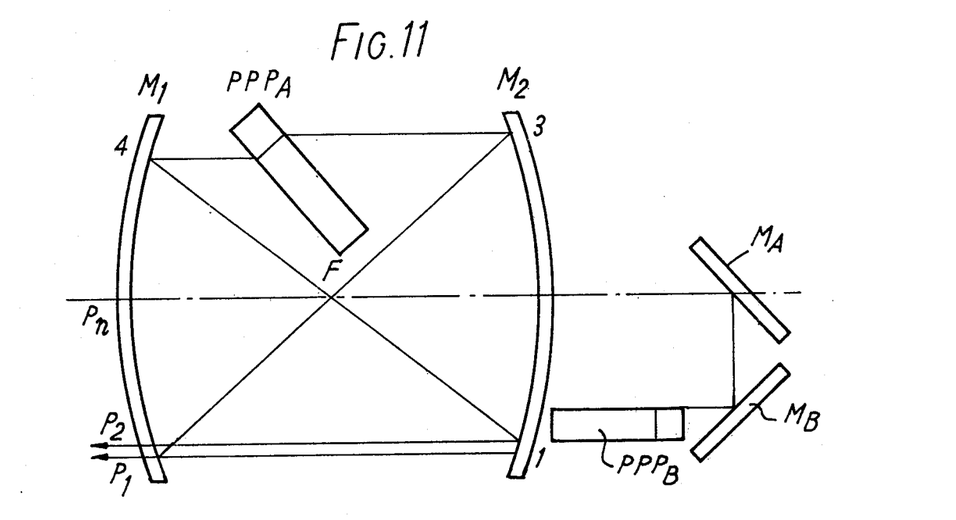
Figure 12:
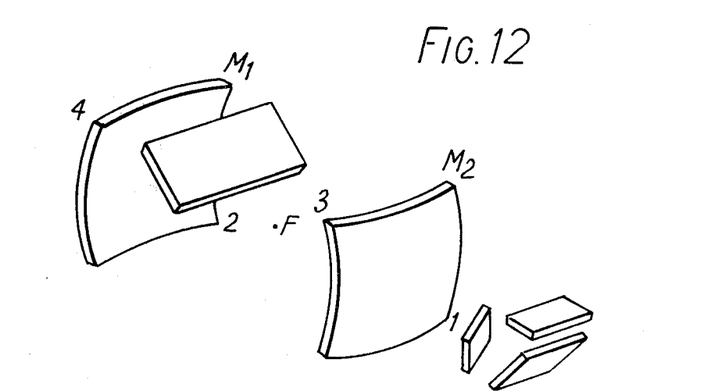

In order to attain a two-dimensional scan, one must add additional elements to the system in order to: (1) start a new scan line parallel to the first, and (2) move the beam to the initial starting point of the new scan line. This is illustrated in FIGS. 10, 11, and 12. FIG. 10 is a top view; FIG. 11 a side view; and FIG. 12 is a dimetric projection, of the system in FIG. 4—but with the added elements necessary for a two-dimensional scanning system. The references used in FIGS. 10 and 11 correspond to those of FIG. 8. The references used in FIG. 12 correspond to those used in FIGS. 8, 10 and 11.

In FIGS. 10 and 11 (right side) is a plane parallel plate which jogs or jerks the beam over to start a new scan line. Furthermore, two plane mirrors at 45° to each other, move the beam to its initial starting point of its new scan line. This mechanism acts only at the *end* of a complete scan line, where the beam leaves the main scanning system so as to enable these outside elements to have it re-enter the main system in the correct position to start a completely new scan line. This is repeated for as many scan lines as the system is designed for, and the scan pattern will be similar to that of a CRT raster pattern.

In FIG. 11, item $PPP_A$ is a plane parallel plate to scan the lines at $P_1, P_2 \ldots P_n$, and item $PPP_B$ is a plane parallel plate to jog the beam over to start a new scan line $L_1, L_2 \ldots L_n$. $M_A$ and $M_B$ are two mirrors arranged at 90° to each other, and 45° to the optical axis, to move the beam to the initial starting point of a new scan line.

There now will be described systems which offer a significant difference from the known systems. These systems of the present invention have a stable high-resolution spot diameter, regardless of the number of scan positions. In other words N, the number of high-resolution spots, does not enter into the equations for the size of the spot diameter.

Figure 5:
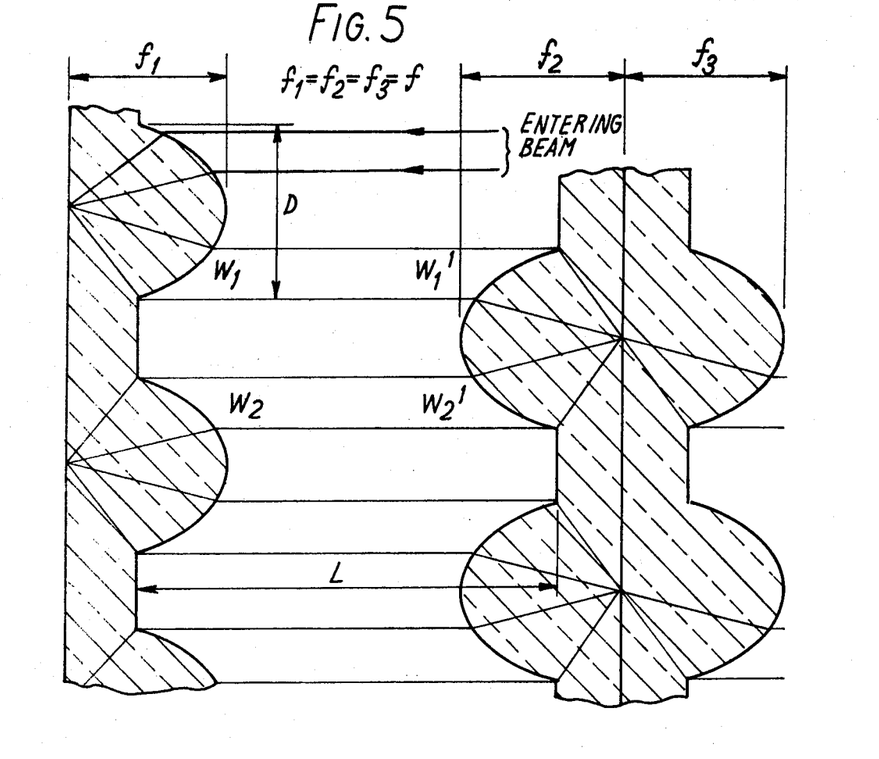
FIG. 5 is a schematic side elevation of a third preferred embodiment of system having an array of microhyperbaloid lenses.

The first of these systems, having an array of microparaboloid lenses, is illustrated in FIG. 5.

It is assumed that the pulsed beams are adjacent, and $w_1 = w_1'$. It is desired to make w a minimum and D a minimum.

It will be obvious that since the beams are adjacent, with each one taking up one-half the lens diameter, D, the system is linear.

In effect, there is a truncated Gaussian beam and from appropriate diffraction theory:

$$w' = 4\lambda L/D$$

It would be possible to use $w = \alpha D$, where $\alpha$. If $w = w'$, then:

$$w^2 = 4\alpha\lambda L, \text{ where } \alpha \leq \tfrac{1}{2}.$$

and :

$$w = 2[\alpha\lambda L]^{\tfrac{1}{2}}$$

The nature of this system poses certain restrictions. As a practical consideration it is desired that f shall be small enough to allow for symmetry of focus upon reflection, but large enough to give a reasonable F#, greater than one.

With such small dimensions, accurate alignment might be a problem, but if $\alpha$ is made very small, the beam can be deliberately spread very wide, and an array of pin-holes can be placed in front of one of the lens systems. Thus, if the holes were aligned properly with that second lens system, the first system could be displaced slightly with no ill effects. Any losses could easily be compensated for by laser gain within the system itself.

L is restricted as well by the desired repetition rate (propagation time is 1 ns/ft). For example, if L=1 meter, $\lambda = \tfrac{1}{2} \times 10^{-6}$ meters, and $\alpha = \tfrac{1}{2}$:

$$w = 2[\tfrac{1}{4} \times 10^{-6}]^{\tfrac{1}{2}} = 10^{-3} \text{ meters} = 1 \text{ mm}$$

with a repetition rate of 150 MHz.

Figure 9:
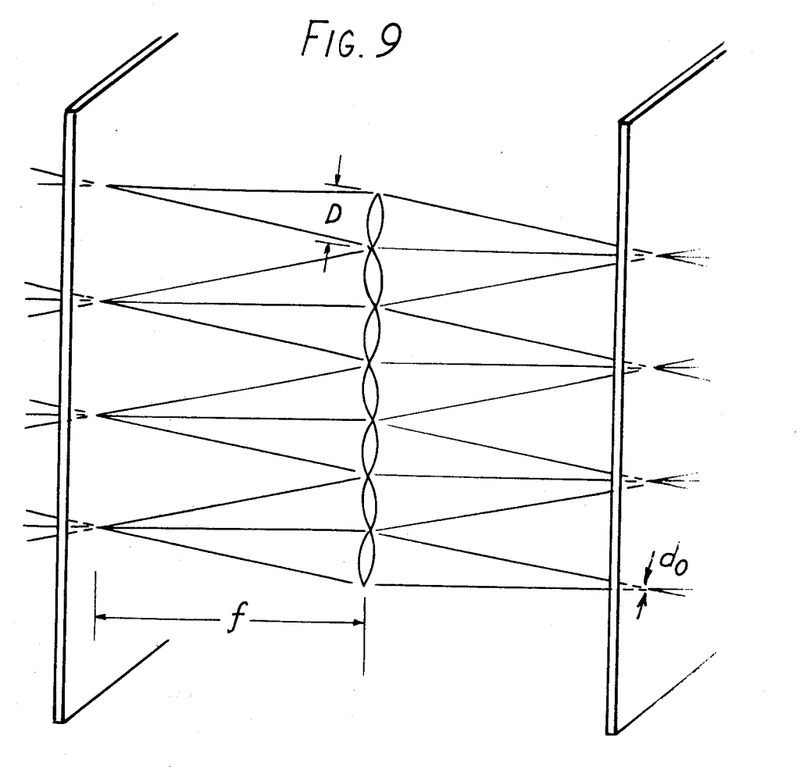
FIG. 9 shows an arrangement of lenses of a fifth preferred embodiment in zig-zag formation.

The next system, employing zig-zag lens elements, is illustrated in FIG. 9.

For this system it is necessary to minimise both D and $d_o$, depending on the use. To allow the scan spacing to be greater than the spot diameter, it is assumed that $D = \beta d_o$ where $\beta > 1$.

From diffraction theory, again:

$$d_o = 2\lambda f/D = 2\lambda f/\beta d_o$$

and $$d_o = [2\lambda f/\beta]^{\tfrac{1}{2}}$$

A restriction on the path length is again the repetition rate:

repetition rate = speed of light/path where the path equals 4f.
Furthermore:

$$f = \tfrac{3}{4} \times 10^8 \text{ repetition rate, or}$$

$$d_o = [(3/2)\lambda 10^8/\beta \text{ repetition rate}]^{\tfrac{1}{2}}$$

and the F# equals f/D equals $(3 \times 10^8/4 \times \text{repetition rate} \times D)$.

Finally:

$$F\# = \tfrac{1}{2}[3/2\lambda\beta R]^{\tfrac{1}{2}} \times 10^4$$

where R is the repetition rate of the pulses.

As an example, let R = 100 MHz = $10^8$, $\lambda = \tfrac{1}{2} \times 10^{-6}$, and $\beta = 1$;

$$d_o = \frac{\sqrt{3}}{2} \times 10^{-3} \text{ meters} = \frac{\sqrt{3}}{2} \text{ mm}$$

If $\beta$ was made larger, $d_o$ would be smaller, and:

$$F\# = \frac{\sqrt{3}}{2} \times 10^3$$

It will be appreciated by those skilled in the art of holography that it would be possible to take a hologram of a lens, and use that hologram to replace a lens in the scanning device. For the systems of FIGS. 5 and 9 this would be simply a matter of practicality and cost, rather than of technique. A laser is needed to view most holograms, and in its use in the present invention, a hologram would be a flat plate which looked like the systems of FIGS. 5 and 9 when viewed from any direction (three-dimensional), or would be invisible to the naked eye, depending upon the holographic technique used.

Figure 6:
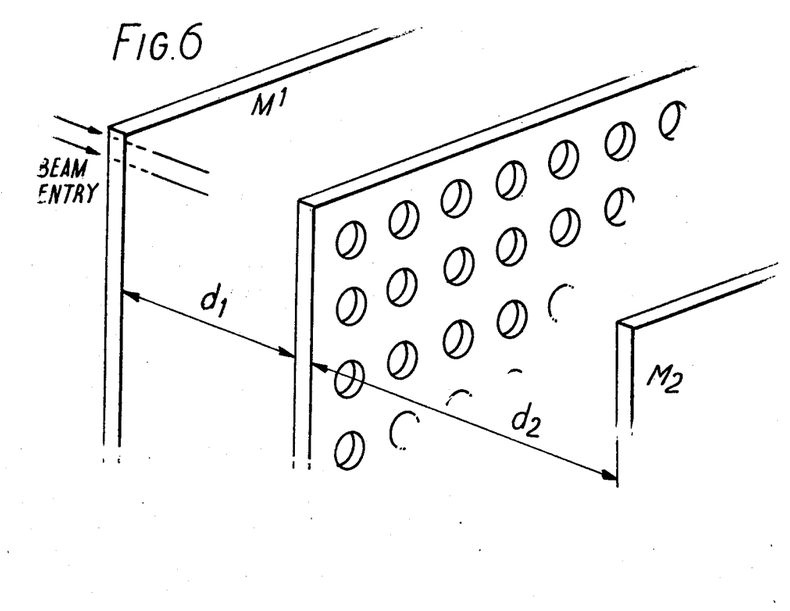
FIG. 6 is a perspective elevation of a fourth preferred embodiments of system using an array of pinholes.

Referring to FIG. 6, in a further preferred embodiment having an array of pin holes, the pattern of pulsed beams in this two-dimensional scanning/deflection array eventually stabilises after going through several holes. The losses at that juncture are then a smoothly varying function of the hole sizes and the distances between them. The power distribution resembles a "stopped down" Gaussian curve and the losses for the output mirror should be about 3 db/pass. This would be made up by a laser gain in the system.

If it is assumed that:
$a_1$ = diameter of input spots
$a_2$ = diameter of the holes on the pinhole screen
$a_3$ = diameter of spots at output ($M_2$)
$a_4$ = diameter of spots reflected back to the pinhole screen
$S_o$ = output separation (space between $a_3$'s)
$S_i$ = input separation (space between $a_1$'s)
$S_h$ = pinhole separation (space between $a_2$'s)

Assuming that $d_2$ is greater than $a_2/\lambda$, then from diffraction theory:

$$a_3 = 2d_2\lambda/a_2$$

And:

$$a_4 = 4d_2\lambda a_2$$

and $a_4$ must be $< S_h$.

To minimise the spreading of the beam before going through the pinhole screen, the system is set up with $d_1 = d_2 = d$.

The spacing of the input spots $(s_i)$ is:

$$S_i = S_h \frac{(d_1 + d_2)}{d_2} = 2S_h \text{ (if } d_1 = d_2)$$

And:

$$S_o = S_i = 2S_h \text{(if } d_1 = d_2)$$

For non-overlapping beams, $S_o \geq a_3$.

From the geometry of the system in the region of the pinholes:

$$S_h = (a_4 + a_2)/2$$

Since $S_i = 2S_h$:

$$S_h = S_o/2$$

And, in conclusion, $$S_o \geq a_2 + a_4$$

and, $$S_o \geq a_3.$$

Ideally $a_3 = a_2 + a_4$, and this would be obtainable with an array of micro-lenses at the output. The array of micro-lenses at the output could be combined with an array of pinholes in the center.

Or $$S_o \frac{4\lambda d_2}{a_2} + a_2 = \frac{4\lambda d_2 + a_2^2}{a_2};$$

and to minimise $S_o$:

$$\frac{a_2(2a_2) - 4\lambda d_2 - a_2^2}{a_2^2} = 0,$$

$$a_2^2 - 4\lambda d_2 = 0$$

and, by setting the two effects equal:

$$a_2 = 2[\lambda d_2]^{\frac{1}{2}}$$

The repetition rate (rr):

$$rr = \frac{1}{2(d_1 + d_2)/3 \times 10^8}$$

$$= \frac{1.5 \times 10^8}{d_1 + d_2} \text{ pulses/second}$$

$$= \frac{75}{d} \text{ MHz, where } d_1 = d_2, \text{ in meters.}$$

In conclusion: d should be $\geq 10$ cm.

Example: $d = 10$ cm; $\lambda = \frac{1}{2} \times 10^{-6}$ $a_2 = 0.44$ mm $$S_o \geq 0.88 \text{ mm; or,}$$

for 100 scans 8.8 cm is needed.

These systems provide a very large number of high-resolution spots at a very small spot diameter.

It is emphasised that the improved systems of this invention use a pulsed laser beam, and therefore need an outside laser source to supply this pulsed beam. The frequency of pulses can be from near DC to the picosecond range, which increases the function capabilities tremendously.

Most applications require a very small pixel size at the aperture; however there are applications, notably laser radar, where very large pixel sizes at the aperture are crucial. These systems are flexible and can have any pixel size, with the focal points of the scanned beamed either in the system or at some external location, even up to several hundred miles away.

With respect to the category of systems which have a continuous refocusing of the laser beam using the aperture of a single lens for scanning, i.e. double focusing fresnel, it should be noted that there is a finite number of obtainable pixels at a reasonable size. However, these systems can be put in tandem to increase the number of pixels, i.e. if one lens can give a scan line of 1000 pixels, two lenses will give 2000 pixels, etc. This also applies to x-y patterns.

It is important to note that the last output beam of any one scanning deflection system can be used as the initial input beam of any second scanning/deflection system. This permits further reduction of the significance of the number of high-resolution spots appearing in the equations for the spot diameter, since all of the formulae assume that the spot diameter remains constant for a given number of high-resolution spots employing the full aperture of a given system.

It should also be noted, that one can keep the pulsed beams, as they are in the cavity, at any desired spacing between them; overlapping, spaced at a distance, or adjacent. By overlapping the beams one can get a series of beams, each one overlapping both in time and space, to achieve a single, stepped beam of high power (GAUSSIAN density distribution) and long length (many times the cavity). By keeping the beams at a distance from each other, one can optically further separate them for individual tasks or skip scanning.

Skip scanning refers to a means of utilising information in a scanning device. Ordinarily one would use the information coming from the scanner in the manner that the scanner presented it. For example, bit 1, bit 2, bit 3, etc. However, let it be supposed that the speed of the scanner is far in excess of the speed that the information can be used, as for instance, in audio output or television. In these instances the speeds that the information can be used is hundreds and even thousands of times less than the speed output of the scanner. Rather than change the configuration of the scanner, it is suggested to merely change the serial order of taking the information out of the scanner. For instance, suppose one utilised bit 1, then bit 1001, then bit 2001, etc., the time between bits utilised would, in this case be 1000 times slower than if one merely utilised the information in sequence. Hence, by recording the information properly, and by taking out the information predetermined staggered intervals, one can use the same scanner configuration for any application where the speed output of the scanner varies from that of the real-time information utilisation. One would, of course, have to scan the material 1000 times rather than one time, but this is a small inconvenience.

Possible novel applications of the scanning systems are (i) a laser self-scanning camera, (ii) a new volatile memory bank, and (iii) low frequency information processing.

The laser self-scanning camera provides its own light source, and by measuring the time between individual scans and their reflection to a photo-cell, a digitised three-dimensional information log of an object can be built up.

Hence, such a device could be used to create three-dimensional graphical displays, take measurements, or provide information at predetermined times, such as in monitoring.

With the volatile memory bank, a continuous laser beam is modulated before it enters the scanning system, and there is obtained a beam of information bits. Since the scanning systems provide a folded optical path, it is possible to use this path, in three dimensions, to store a very long series of these modulated bits. Thus, assuming picosecond modulation and a 0.5 mm separation in adjacent planes, these would be $3 \times 10^{10}$ bits/sq.ft.

This memory could be stored indefinitely as long as laser gain were provided, and would be "dumped" in approximately 30 seconds when needed.

Low frequency information processing could be obtained by scanning at a normally high rate and using let us say, the first bit of one complete scan; then the second bit of the next scan, and so on and so forth. This would allow a "normal system" to scan at much lower rates with only the addition of accurate timing and high-speed switching.

Figure 13:
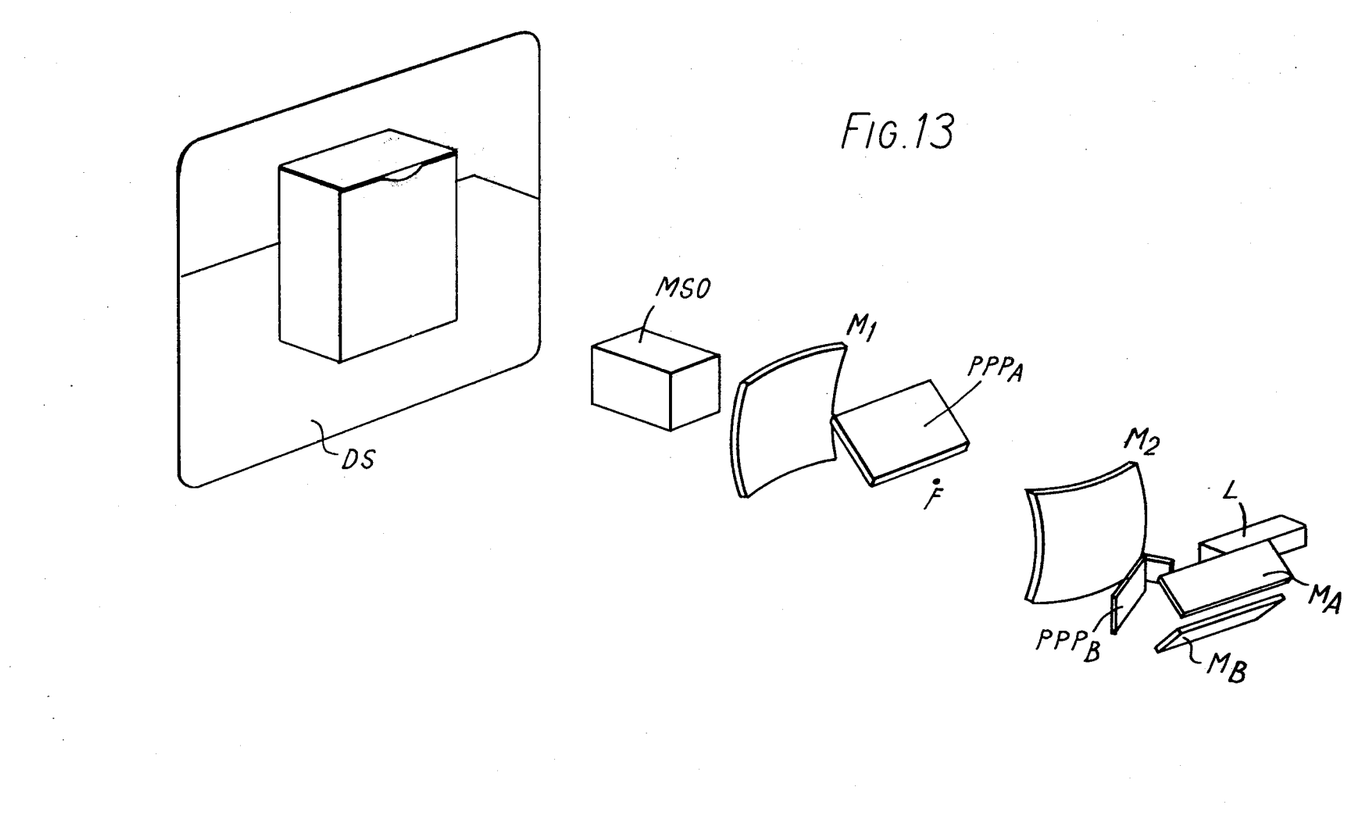
FIG. 13 is a perspective view of a complete assembly including the system of the invention.

FIG. 13 shows a representative schematic layout of a complete system for utilisation of the optical system of the invention, any one of the preferred embodiments described being inserted at "A".

In FIG. 13 there are provided:

L = a laser m = a mirror to deflect the laser beam onto $M_A$ and $M_B$ = a pair of plane mirrors as seen at the right-hand side in FIGS. 11 and 12

$M_1$ and $M_2$ = curved mirrors as seen in FIGS. 10, 11, 12.

$PPP_A$ = plane parallel to scan the lines $P_1, P_2 \ldots P_n$ $PPP_B$ = plane parallel plate to jog the beam over to start a new scan line $L_1, L_2 \ldots L_n$.

MSO = a modulator and screen optics system

DS = screen

The embodiments shown are merely exemplary and modifications may be made without departing from the scope of the invention as defined by the appended claims.

I claim:

1. In a system, for use in a non-mechanical electromagnetic scanning device having a source of pulsed beams of electromagnetic energy, said system comprising:
   (i) first and second opposed mirrors disposed in spaced relationship
   (ii) means disposed between said mirrors to offset, at each pass of the beam between said mirrors, a pulsed beam directed onto one of said mirrors and reflected thereby towards the other of said mirrors, thereby to result in a plurality of successively offset passes of pulsed beam,
   the improvement that, in combination:
   (a) said second mirror is less than wholly reflective over all of its reflective surface whereby a portion of the beam at each said pass towards said second mirror emerges through said less than wholly reflective second mirror
   (b) said mirrors are of the same focal length and have their optical axes parallel
   (c) said offsetting means serve to offset each said pass of the beam normal to said optical axes, and
   (d) said beam is refocused at each said pass so as to maintain uniform spot diameter,
   whereby the portions of beam emerging through said second mirror from a linear scan pattern.

2. A system, as claimed in claim 1, wherein said beam offsetting means, and means for refocusing said beam are both constituted by two fresnel lenses.

3. A scanning device comprised of, in combination:
   (i) a source of pulsed beam,
   (ii) a system as set forth in claim 1
   (iii) a modulator for an array of pulsed beams produced by said system, and
   (iv) a receiver for said modulated array.

* * * * *